United States Patent
Xie et al.

(10) Patent No.: US 11,176,494 B2
(45) Date of Patent: Nov. 16, 2021

(54) METHOD AND APPARATUS FOR GENERATING MODEL, METHOD AND APPARATUS FOR RECOGNIZING INFORMATION

(71) Applicant: Beijing Baidu Netcom Science and Technology Co., Ltd., Beijing (CN)

(72) Inventors: Yongkang Xie, Beijing (CN); En Shi, Beijing (CN); Xiaoyu Chen, Beijing (CN); Shupeng Li, Beijing (CN); Shimin Ruan, Beijing (CN); Tuobang Wu, Beijing (CN); Ying Zhao, Beijing (CN); Lianghuo Zhang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 360 days.

(21) Appl. No.: 16/424,109

(22) Filed: May 28, 2019

(65) Prior Publication Data
US 2019/0370685 A1    Dec. 5, 2019

(30) Foreign Application Priority Data
May 29, 2018   (CN) .......................... 201810529022.5

(51) Int. Cl.
*G06N 20/00*    (2019.01)
*H04L 29/08*    (2006.01)

(52) U.S. Cl.
CPC ............. *G06N 20/00* (2019.01); *H04L 67/34* (2013.01)

(58) Field of Classification Search
CPC .. G06F 8/71; G06F 9/44505; G06F 2212/401; G06F 8/60; G06N 3/082
See application file for complete search history.

(56) References Cited

U.S. PATENT DOCUMENTS

| | | | |
|---|---|---|---|
| 2019/0146759 A1* | 5/2019 | Chiang | G06N 5/003 717/104 |
| 2019/0197406 A1* | 6/2019 | Darvish Rouhani | G06N 20/00 |
| 2019/0222670 A1* | 7/2019 | Sarkar | G06F 9/461 |
| 2020/0012500 A1* | 1/2020 | Kern | G06F 8/60 |

OTHER PUBLICATIONS

D. Hills, "Introduction to Machine Learning on Mobile," published Apr. 23, 2018, downloaded from https://medium.com/@dmennis/introduction-to-machine-learning-on-mobile-36845619c56 (Year: 2018).*

* cited by examiner

*Primary Examiner* — Eric J Yoon
(74) *Attorney, Agent, or Firm* — Nixon Peabody LLP

(57) ABSTRACT

A method and apparatus for generating a model, and a method and apparatus for recognizing information are provided. An implementation of the method for generating a model includes: acquiring a to-be-converted model, a topology description of the to-be-converted model, and device information of a target device; converting, based on the topology description and the device information, parameters and operators of the to-be-converted model to obtain a converted model applicable to the target device; and generating a deep learning prediction model based on the converted model. This embodiment enables the conversion of an existing model to a deep learning prediction model that can be applied to a target device.

12 Claims, 4 Drawing Sheets

METHOD AND APPARATUS FOR GENERATING MODEL, METHOD AND APPARATUS FOR RECOGNIZING INFORMATION

CROSS-REFERENCE TO RELATED APPLICATIONS

This disclosure claims priority to Chinese Patent Application no. 201810529022.5, filed with the China National Intellectual Property Administration (CNIPA) on May 29, 2018, the contents of which are incorporated herein by reference in their entirety.

TECHNICAL FIELD

Embodiments of the present disclosure relate to the field of computer technology, and specifically to a method and apparatus for generating a model, and a method and apparatus for recognizing information.

BACKGROUND

As deep learning is gradually adopted by various professions, a universal deep learning model often cannot meet a user's customized AI (Artificial Intelligence) requirements. More and more users use specific data to customize and train models of their own, for adapting to specific scenarios, such as image classification, object inspection, video analysis, voice recognition, and voiceprint recognition. Since existing model generation tools typically support a limited number of hardware devices, models generated by the users using the existing model generation tools are often applied to the specific hardware devices and cannot be applicable to devices other than the specific hardware devices.

SUMMARY

Embodiments of the present disclosure provide a method and apparatus for generating a model, and a method and apparatus for recognizing information.

In a first aspect, the embodiments of the present disclosure provide a method for generating a model, including: acquiring a to-be-converted model, a topology description of the to-be-converted model, and device information of a target device; converting, based on the topology description and the device information, parameters and operators of the to-be-converted model to obtain a converted model applicable to the target device; and generating a deep learning prediction model based on the converted model.

In some embodiments, the device information includes a heterogeneous computing chip type identifier and an command set version; and the converting, based on the topology description and the device information, parameters and operators of the to-be-converted model includes: acquiring a preset parameter conversion template and a preset operator conversion template associated with the heterogeneous computing chip type identifier and the command set version; for a layer included in the to-be-converted model, analyzing parameters and operators in the layer based on the topology description, converting the parameters in the layer based on the parameter conversion template, and converting the operators in the layer based on the operator conversion template.

In some embodiments, the generating a deep learning prediction model based on the converted model, includes: performing, in response to detecting a model compression command, a compression indicated by the model compression command on the converted model to obtain a compressed model, and using the compressed model as the deep learning prediction model; where the model compression command is generated in response to a preset model compression option being selected, and the model compression option includes at least one of: a first model compression option for reducing precision of the parameters, a second model compression option for merging or pruning layers in the model, or a third model compression option for pruning the parameters of the model In some embodiments, the method further includes: providing a software development kit corresponding to the target device to a user, where the software development kit is used for providing a model prediction interface associated with the deep learning prediction model.

In some embodiments, the method further includes: generating an application corresponding to the target device, the application being integrated with the deep learning prediction model.

In a second aspect, the embodiments of the present disclosure provide a method for recognizing information, including: determining a current prediction mode, in response to receiving to-be-recognized information associated with the deep learning prediction model generated by using the method as described in any one of the implementations of the first aspect, the prediction mode including an offline prediction mode for performing predictions locally on the target device, and the target device being a device containing the deep learning prediction model; and recognizing the to-be-recognized information using the deep learning prediction model, in response to determining that the offline prediction mode is currently in use.

In some embodiments, the predication mode further includes a hybrid mode for selecting an online prediction or an offline prediction based on a network condition; and the method further includes: determining whether the target device is currently in communication connection with a cloud server, in response to determining that the hybrid mode is currently in use; and recognizing the to-be-recognized information using the deep learning prediction model, in response to determining that the target device is not currently in communication connection with the cloud server.

In some embodiments, before recognizing the to-be-recognized information using the deep learning prediction model, the method further includes: determining, based on preset device information of the target device, whether the target device includes a heterogeneous computing chip associated with a computing acceleration command, in response to detecting the computing acceleration command, where the computing acceleration command is generated in response to a preset computing acceleration option being selected, and the computing acceleration option includes at least one of: a first computing acceleration option for accelerating computing using a network processor, a second computing acceleration option for accelerating computing using a graphics processor, or a third computing acceleration option for accelerating computing using a field programmable gate array; and scheduling an operation of a layer associated with the heterogeneous computing chip in the deep learning prediction model onto the heterogeneous computing chip for executing, in response to determining that the target device includes the heterogeneous computing chip.

In a third aspect, the embodiments of the present disclosure provide an apparatus for generating a model, including:

an acquisition unit, configured to acquire a to-be-converted model, a topology description of the to-be-converted model, and device information of a target device; a conversion unit, configured to convert, based on the topology description and the device information, parameters and operators of the to-be-converted model to obtain a converted model applicable to the target device; and a generation unit, configured to generate a deep learning prediction model based on the converted model.

In some embodiments, the device information includes a heterogeneous computing chip type identifier and an command set version; and the conversion unit is further configured to: acquire a preset parameter conversion template and a preset operator conversion template associated with the heterogeneous computing chip type identifier and the command set version; for a layer included in the to-be-converted model, analyze parameters and operators in the layer based on the topology description, convert the parameters in the layer based on the parameter conversion template, and convert the operators in the layer based on the operator conversion template.

In some embodiments, the generation unit is further configured to: perform, in response to detecting a model compression command, a compression indicated by the model compression command on the converted model to obtain a compressed model, and use the compressed model as the deep learning prediction model; where the model compression command is generated in response to a preset model compression option being selected, and the model compression option includes at least one of: a first model compression option for reducing precision of the parameters, a second model compression option for merging or pruning layers in the model, or a third model compression option for pruning the parameters of the model.

In some embodiments, the apparatus further includes: a software development kit providing unit, configured to provide a software development kit corresponding to the target device to a user, where the software development kit is used for providing a model prediction interface associated with the deep learning prediction model.

In some embodiments, the apparatus further includes: a first generation unit, configured to generate an application corresponding to the target device, the application being integrated with the deep learning prediction model.

In a fourth aspect, the embodiments of the present disclosure provide an apparatus for recognizing information, including: a determination unit, configured to determine a current prediction mode, in response to receiving to-be-recognized information associated with the deep learning prediction model generated by using the method as described in any one of the implementations of the first aspect, the prediction mode including an offline prediction mode for performing predictions locally on the target device, and the target device being a device containing the deep learning prediction model; and a reorganization unit, configured to recognize the to-be-recognized information using the deep learning prediction model, in response to determining that the offline prediction mode is currently in use.

In some embodiments, the predication mode further includes a hybrid mode for selecting an online prediction or an offline prediction based on a network condition; and the apparatus further includes: a first determination unit, configured to determine whether the target device is currently in communication connection with a cloud server, in response to determining that the hybrid mode is currently in use; and a first reorganization unit, configured to recognize the to-be-recognized information using the deep learning prediction model, in response to determining that the target device is not currently in communication connection with the cloud server.

In some embodiments, the apparatus further includes: a second determination unit, configured to determine, based on preset device information of the target device, whether the target device includes a heterogeneous computing chip associated with a computing acceleration command, in response to detecting the computing acceleration command, where the computing acceleration command is generated in response to a preset computing acceleration option being selected, and the computing acceleration option includes at least one of: a first computing acceleration option for accelerating computing using a network processor, a second computing acceleration option for accelerating computing using a graphics processor, or a third computing acceleration option for accelerating computing using a field programmable gate array; and a scheduling unit, configured to schedule an operation of a layer associated with the heterogeneous computing chip in the deep learning prediction model onto the heterogeneous computing chip for executing, in response to determining that the target device includes the heterogeneous computing chip.

In a fifth aspect, the embodiments of the present disclosure provide an electronic device, including: one or more processors; a storage apparatus, storing one or more programs thereon; and the one or more programs, when executed by the one or more processors, cause the one or more processors to implement the method according to any one of the embodiments in the first aspect and the method according to any one of the embodiments in the second aspect.

In a sixth aspect, the embodiments of the present disclosure provide a non-transitory computer readable medium, storing a computer program thereon, the computer program, when executed by a processor, implements the method according to any one of the embodiments in the first aspect and the method according to any one of the embodiments in the second aspect.

The method and apparatus for generating a model provided by the embodiments of the present disclosure acquire a to-be-converted model, a topology description of the to-be-converted model, and device information of a target device, so as to convert, based on the topology description and the device information, parameters and operators of the to-be-converted model to obtain a converted model applicable to the target device, and generate a deep learning prediction model applicable to the target device based on the converted model, enabling the conversion of an existing model to a deep learning prediction model that can be applied to a target device.

The method and apparatus for recognizing information provided by the embodiments of the present disclosure determine a current prediction mode, in response to receiving to-be-recognized information associated with the deep learning prediction model generated by using the method as described in any one of the implementations of the first aspect, and may recognize the to-be-recognized information using the deep learning prediction model, in response to determining that the offline prediction mode is currently in use. Therefore, the setting of the prediction mode is effectively utilized, and the user may pre-select a desired prediction mode, thereby realizing the customization of the prediction service. For example, when it is detected that the user has pre-selected the offline prediction mode, the to-be-recognized information is locally recognized using the deep learning prediction model.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the convenience of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
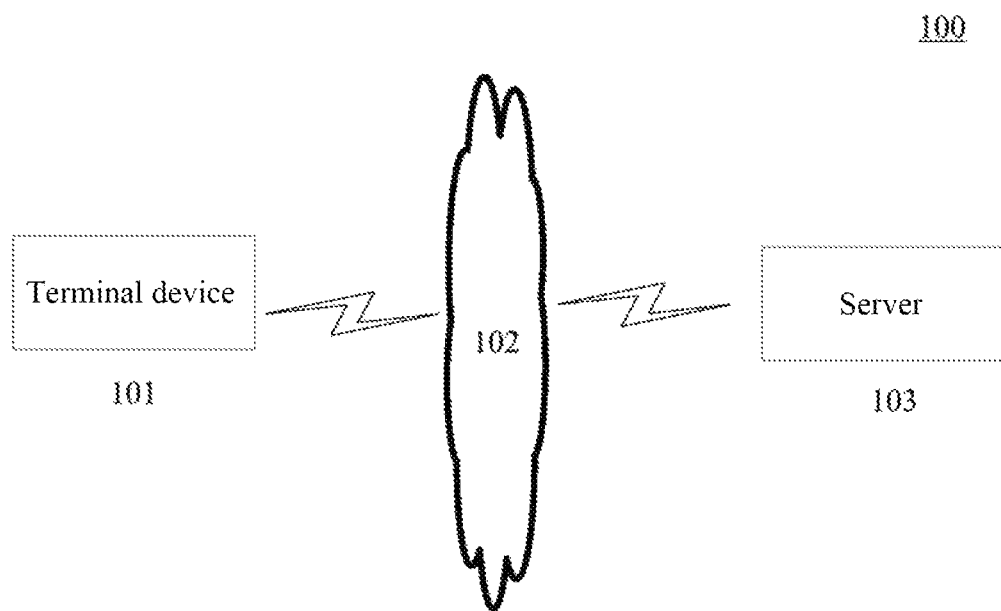
FIG. 1 is an illustrative system architecture diagram to which an embodiment of the present disclosure may be applied.

FIG. 1 illustrates an illustrative system architecture 100 for a method and apparatus for generating a model, a method and apparatus for recognizing information to which the present disclosure may be applied.

As shown in FIG. 1, the system architecture 100 may include a terminal device 101, a network 102, and a server 103. The network 102 may be configured to provide a communication link medium between the terminal device 101 and the server 103. The networks 102 may include various types of connections, such as wired, wireless communication links, or optical fibers.

The user may interact with the server 103 via the network 102 using the terminal device 101 to receive or transmit information and the like. A deep learning prediction framework may be deployed on the terminal device 101, which may provide a library environment applicable to different devices, and may also provide an operation interface for the user to use. The terminal device 101 may use the deep learning prediction framework to receive a model generation request of the user (for example, a model generation request sent through the operation interface), and process such as analyze the request.

The terminal device 101 may be hardware or software. When the terminal device 101 is hardware, it may be various electronic devices, including but not limited to smart phones, tablets, handheld scanners, microphone arrays, cameras, etc. When the terminal device 101 is software, it may be installed on the above-listed electronic devices. It may be implemented as a plurality of software or software modules (e.g., to provide distributed services) or as a single software or software module, which is not specifically limited in the present disclosure.

The server 103 may be a server that provides various services, such as a server for storing a trained model required by the terminal device 101. In addition, the server may be hardware or software. When the server is hardware, it may be implemented as a distributed server cluster composed of a plurality of servers, or as a single server. When the server is software, it may be implemented as a plurality of software or software modules (e.g., to provide distributed services), or as a single software or software module, which is not specifically limited in the present disclosure.

It should be noted that the method for generating a model and the method for recognizing information provided by the embodiment of the present disclosure are generally performed by the terminal device 101. Accordingly, the apparatus for generating a model and the apparatus for recognizing information are generally provided in the terminal device 101.

It should be noted that if the model to be acquired by the terminal device 101 has been pre-stored locally, the system architecture 100 may not include the server 103.

It should be understood that the number of terminal devices, networks, or servers in FIG. 1 is merely illustrative. Depending on the implementation needs, there may be any number of terminal devices, networks, or servers.

Figure 2:
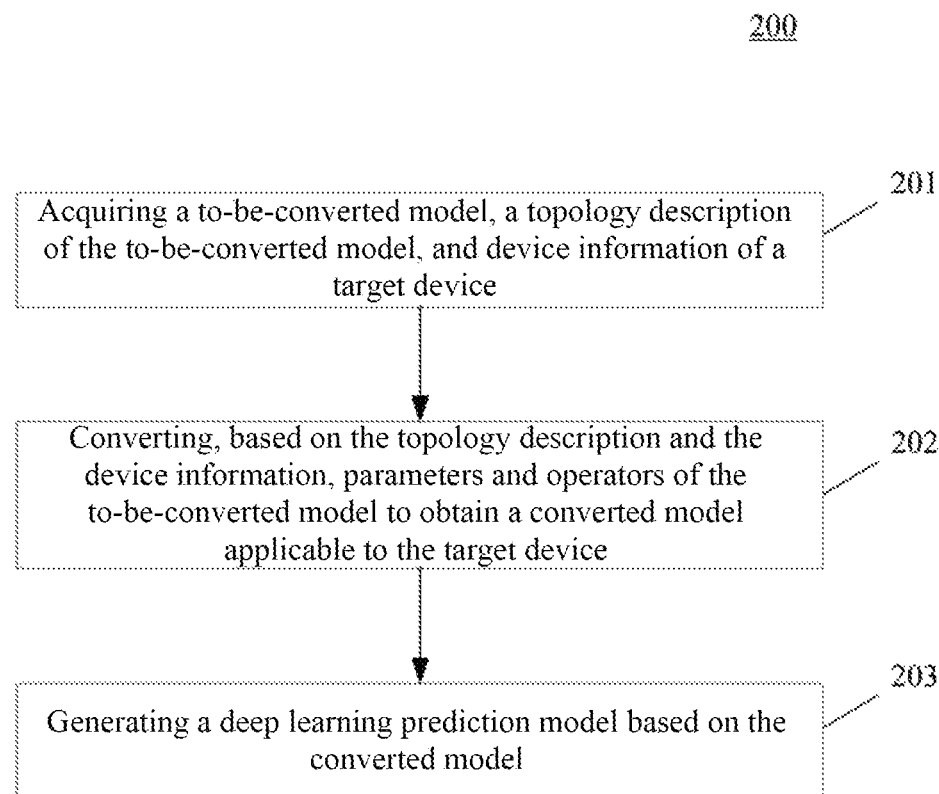
FIG. 2 is a flowchart of an embodiment of a method for generating a model according to the present disclosure.

With further reference to FIG. 2, a flow 200 of an embodiment of a method for generating a model according to the present disclosure is illustrated. The method for generating a model includes the following steps:

Step 201, acquiring a to-be-converted model, a topology description of the to-be-converted model, and device information of a target device.

In some embodiments, an executor of the method for generating a model (for example, the terminal device 101 as shown in FIG. 1) may receive a model generation request of the user, and generate a request to acquire a to-be-converted model, a topology description of the to-be-converted model, and device information of a target device based on the model generation request. The target device may be the above executor itself or an electronic device where the executor is located.

The above model generation request may include the to-be-converted model, the topology description of the to-be-converted model, and the device information of the target device. Therefore, the executor may acquire the to-be-converted model, the topology description of the to-be-converted model, and the device information of the target device from the model generation request. Alternatively, the model generation request may include the identifier of the to-be-converted model and the device information of the target device. Therefore, the executor may directly acquire the device information of the target device from the model generation request, and acquire the to-be-converted model and the topology description of the to-be-converted model from the connected server (for example, the server as shown in FIG. 1) based on the identifier. It should be understood that some embodiments does not limit the method for acquiring the to-be-converted model, the topology description of the to-be-converted model, and the device information of the target device.

In some embodiments, the to-be-converted model may be a trained model under any type of deep learning framework. Types of the deep learning frameworks may include, for example, TensorFlow, Caffe, Theano, or Keras. Here, TensorFlow is a relatively advanced machine learning library, and users may easily use it to design neural network structures. Caffe is an abbreviation of Convolutional Architecture for Fast Feature Embedding, which is a widely used open source deep learning framework. Theano is a high performance symbolic computing and deep learning library. Keras is a highly modular neural network library that is implemented in Python (Object-Oriented, Interpreted Computer Programming Language) and may run on both TensorFlow and Theano.

In addition, the topology description of the to-be-converted model may be a topology description file describing the topology of the to-be-converted model. Taking the Caffe deep learning framework as an example, the topology description of the to-be-converted model under this framework may be a .proto file. It should be noted that different models may have different topologies. Taking a convolutional neural network as an example, the topology of the convolutional neural network may include, for example, an input layer, a convolutional layer, a pooling layer, and a fully connected layer.

In some embodiments, the device information of the target device may include, for example, an command set version of the target device. In addition, the device information may also include a heterogeneous computing chip type identifier (such as a type name of the heterogeneous computing chip used by the target device) in addition to the command set version. Here, the type of the heterogeneous computing chip may include, for example, a GPU (Graphics Processing Unit), an FPGA (Field Programmable Gate Array), or an NPU (Neural-network Processing Unit.

Step 202, converting, based on the topology description and the device information, parameters and operators of the to-be-converted model to obtain a converted model applicable to the target device.

In some embodiments, the executor may convert, based on the topology description of the to-be-converted model and the device information of the target device, parameters and operators of the to-be-converted model to obtain a converted model applicable to the target device. The converted model may directly perform forward prediction in a library environment applicable to the target device provided by the deep learning prediction framework deployed locally by the executor.

As an example, the executor may be pre-installed with a model conversion tool, and the executor may send the topology description and the device information to the model conversion tool, so that the model conversion tool converts the parameters and operators of the to-be-converted model, thereby obtaining the converted model applicable to the target device.

As another example, the executor may locally pre-store a parameter conversion template and an operator conversion template. If the device information of the target device includes the type identifier of the heterogeneous computing chip used by the target device and the command set version of the target device, the executor may first acquire locally the parameter conversion template and the operator conversion template associated with the heterogeneous computing chip type identifier and the command set version. Then, for a layer included in the to-be-converted model, for example, each layer, the executor may analyze the parameters and operators in the layer based on the topology description, convert the parameters in the layer based on the parameter conversion template, and convert the operators in the layer based on the operator conversion template. Thus, the executor may obtain the converted model applicable to the target device.

It should be noted that, for the parameter conversion template and the operator conversion template associated with the heterogeneous computing chip type identifier and the command set version in the device information of the target device, the parameter conversion template may be used to characterize a mapping relationship between parameters of the model under the original deep learning framework in which the to-be-converted model is located and the parameters in the library environment applicable to the target device, such as a mapping relationship with respect to parameter precision. The operator conversion template may be used to characterize a mapping relationship between operators of the model under the original deep learning framework and the operators in the library environment.

Step 203, generating a deep learning prediction model based on the converted model.

In some embodiments, the executor may generate a deep learning prediction model based on the converted model. For example, the executor may directly use the converted model as a deep learning prediction model, so that the user performs relevant prediction operations on the target device using the deep learning prediction model. For example, if the deep learning prediction model is applied to a voice recognition scenario, the user may use the model to recognize to-be-recognized voice information. If the deep learning prediction model is applied to a face recognition scenario, it may be used to recognize a to-be-recognized face image.

It should be noted that the executor converts the to-be-converted model, and then generates a deep learning prediction model based on the converted model, so that models under different deep learning frameworks may be seamlessly and quickly converted. By optimizing the model under different deep learning frameworks, the model may be applied to the user's target device, which extends the application scope of the model in hardware devices.

In practice, limited by the hardware characteristics of a mobile device, in order to solve the problems such as the converted model is too large in volume, too high in power consumption, and too slow in speed when running on the mobile device, the converted model needs to be compressed. Thus, the executor may provide the user with a model compression option for the user to trigger a model compression command by selecting the model compression option. The executor may detect the model compression command in real time, and perform, in response to detecting a model compression command, a compression indicated by the model compression command on the converted model to obtain a compressed model. The executor may use the compressed model as the deep learning prediction model. It should be pointed out that by providing a model compression option to the user, not only the compression of the converted model but also the customization of the model compression service may be realized.

Here, the model compression option may include at least one of the following: a first model compression option for reducing precision of the parameters, a second model compression option for merging or pruning layers in the model, or a third model compression option for pruning the parameters of the model.

It should be noted that the executor may be pre-installed with a model compression tool, and the executor may perform the compression indicated by the model compression command on the converted model by using the model compression tool.

Naturally, the executor may also compress the converted model by using a preset compression algorithm associated with the model compression option corresponding to the received compression command. As an example, assuming that the model compression option corresponding to the compression command is the third model compression option, the executor may compress the converted model by: selecting at least one layer from the layers of the converted model as a to-be-compressed layer; performing the following processing steps for each to-be-compressed layer in descending order of the number of levels of the to-be-compressed layer in the converted model: determining a pruning ratio based on the total number of parameters included in the to-be-compressed layer, selecting a parameter from the parameters included in the to-be-compressed layer for pruning based on the pruning ratio and a threshold value of the parameter value, and training the pruned model based on a preset training sample using a machine learning method; and determining the model obtained by performing the above processing steps on each selected to-be-compressed layer as the compressed model.

It should be noted that each layer of the converted model may have a corresponding number of levels. For example, assuming that the converted model includes an input layer, a hidden layer, and an output layer. The input layer may be the first layer of the converted model, and the number of levels of the input layer may be one. The hidden layer may be the second layer of the converted model, and the number of levels of the hidden layer may be two. The output layer may be the third layer of the converted model, and the number of levels of the output layer may be three.

In addition, the executor may pre-store a set of value ranges locally, where each value range may correspond to a pruning ratio. For each to-be-compressed layer, the executor may first find, in the set of value ranges, the value range in which the total number of parameters included in the to-be-compressed layer is located, and determine the pruning ratio corresponding to the value range as the pruning ratio corresponding to the to-be-compressed layer.

In some alternative implementations of some embodiments, after generating the deep learning prediction model, the executor may provide the user with an SDK (software development kit) corresponding to the target device. Here, the SDK may be used to provide a model prediction interface associated with the generated deep learning prediction model to the user, the interface being an application programming interface (API). The user may perform prediction operations by calling the model prediction interface. In addition, the SDK may also provide the user with at least one of the following APIs: data acquisition, data pre-processing, or post-processing of results.

Here, the executor may send the link address of the SDK to the user for the user to download the SDK. Of course, the executor may also directly store the SDK locally for user's usage.

In some alternative implementations of some embodiments, the executor may also generate an application corresponding to the target device, which is integrated with the generated deep learning prediction model. The executor may send the link address of the application to the user, thereby helping the user to download the application. Of course, the executor may also directly store the application locally for user's usage. It should be noted that the executor may be pre-installed with an application generation tool locally. The executor may send the device information of the target device and the generated deep learning prediction model to the application generation tool, thereby making the application generation tool generate the application.

It should be noted that the SDK may be provided by the executor for developers with mobile device application development capabilities. The application may be provided by the executor for developers lacking mobile device development capabilities. Before providing the SDK or generating the application, the executor may first acquire information for describing the development capability of the user. The executor may then determine whether to provide the SDK to the user based on the information, or to generate the application and provide the application to the user.

In some alternative implementations of some embodiments, the executor may also provide a computing acceleration option to the user for the user's selection of whether to call the heterogeneous computing chip for computing acceleration when performing the prediction operation using the generated deep learning prediction model. Here, the computing acceleration option may include at least one of the following: a first computing acceleration option for accelerating computing using a network processor, a second computing acceleration option for accelerating computing using a graphics processor, or a third computing acceleration option for accelerating computing using a field programmable gate array. In this way, by providing the user with the computing acceleration option, not only the computing acceleration in the prediction process but also the customization of the computing acceleration service may be realized.

Figure 3:
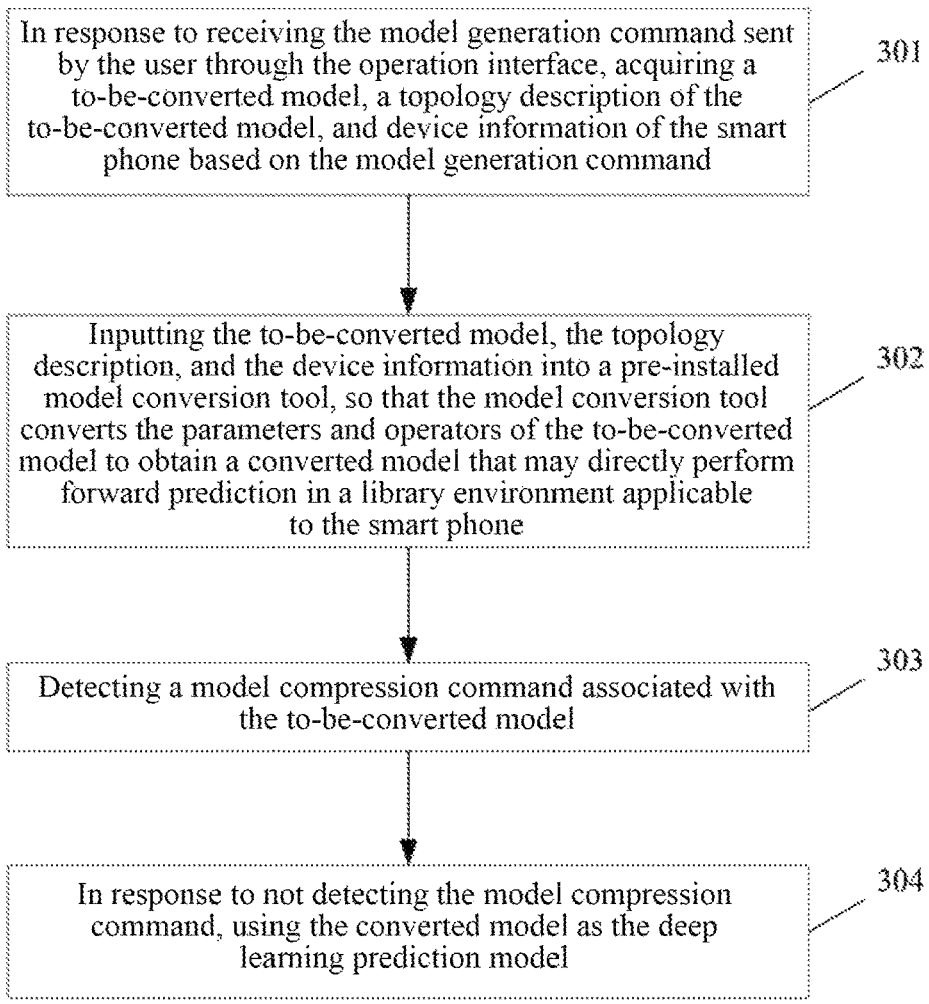
FIG. 3 is a schematic diagram of an application scenario of the method for generating a model according to the present disclosure.

With further reference to FIG. 3, FIG. 3 is a schematic diagram of an application scenario of the method for generating a model according to some embodiments. In the application scenario of FIG. 3, a deep learning prediction framework may be pre-deployed on the smart phone held by the user. The framework may provide a library environment applicable to different devices, including a library environment applicable to the smart phone. Moreover, the framework may also provide an operation interface to the user, thereby enabling the user to send a model generation command through the operation interface. As shown in reference numeral 301, in response to receiving the model generation command sent by the user through the operation interface, the smart phone may acquire a to-be-converted model, a topology description of the to-be-converted model, and device information of the smart phone based on the model generation command. Here, the device information may include the command set version number and the type name of the heterogeneous computing chip. Then, as indicated by reference numeral 302, the smart phone may input the to-be-converted model, the topology description of the to-be-converted model, and the device information into a pre-installed model conversion tool, so that the model conversion tool converts the parameters and operators of the to-be-converted model to obtain a converted model that may directly perform forward prediction in a library environment applicable to the smart phone. Then, as indicated by reference numeral 303, the smart phone may detect a model compression command associated with the to-be-converted model. Finally, as indicated by reference numeral 304, in response to not detecting the model compression command, the smart phone may use the converted model as the deep learning prediction model. In this way, the user may use the deep learning prediction model to perform related prediction operations on the smart phone.

The method for generating a model provided by the above embodiment acquires a to-be-converted model, a topology description of the to-be-converted model, and device information of a target device, so as to converts, based on the topology description and the device information, parameters and operators of the to-be-converted model to obtain a converted model applicable to the target device, and generates a deep learning prediction model applicable to the target device based on the converted model, thereby enabling the conversion of an existing model to a deep learning prediction model that can be applied to a target device.

Figure 4:
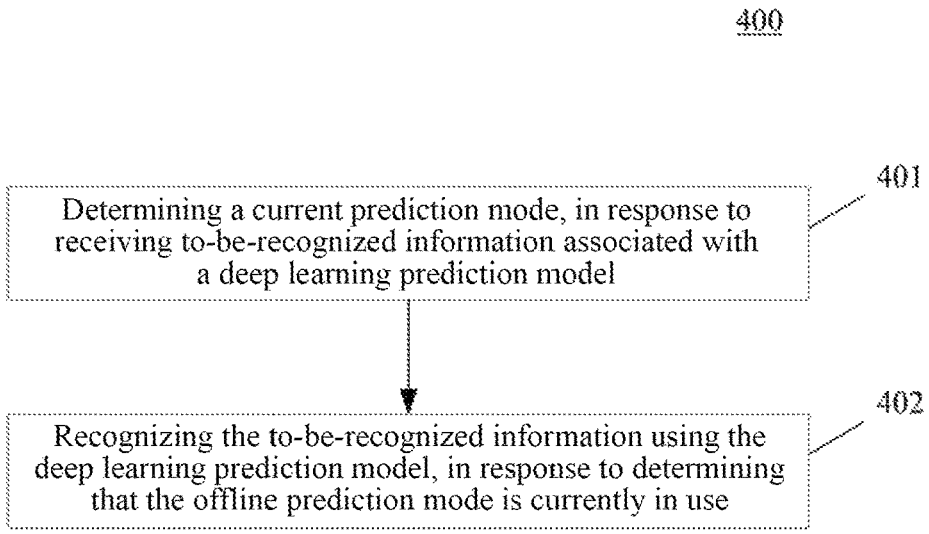
FIG. 4 is a flowchart of an embodiment of a method for recognizing information according to the present disclosure.

With further reference to FIG. 4, a flow 400 of an embodiment of a method for recognizing information is illustrated. The flow 400 of the method for recognizing information includes the following steps:

Step 401, determining a current prediction mode, in response to receiving to-be-recognized information associated with a deep learning prediction model.

In some embodiments, an executor of the method for recognizing information (for example, the terminal device as shown in FIG. 1) may receive to-be-recognized information associated with a deep learning prediction model in real time, and determine a current prediction mode in response to receiving the to-be-recognized information.

Here, the deep learning prediction model may be generated by using the method described in the embodiment shown in FIG. 2. Here, the user may transmit the to-be-recognized information by calling a model prediction interface associated with the deep learning prediction model provided by the SDK associated with the target device. The target device may be the executor itself or a device containing the executor, and the device stores the above deep learning prediction model. Of course, the user may also transmit the to-be-recognized information through an application corresponding to the target device, the application being integrated with the deep learning prediction model.

It should be noted that the contents of the to-be-recognized information may also be different based on the application scenario of the deep learning prediction model. For example, if the deep learning prediction model is applied to a face recognition scenario, the to-be-recognized information may be a to-be-recognized face image. If the deep learning prediction model is applied to a video analysis scenario, the to-be-recognized information may be a to-be-analyzed video. If the deep learning prediction model is applied to a voice recognition scenario, the to-be-recognized information may be to-be-recognized voice information.

In some embodiments, the executor may provide a prediction mode option to the user for the user's selection of which prediction mode is used for recognizing the to-be-recognized information. The prediction mode may include an offline prediction mode, an online prediction mode, and a hybrid prediction mode. The offline prediction mode may be used to indicate that predictions are performed locally on the target device. The online prediction mode may be used to indicate that predictions are performed using a cloud server. Here, the cloud server may store an original model corresponding to the deep learning prediction model (for example, the to-be-converted model in the embodiment shown in FIG. 2). The hybrid mode may be used to indicate that an online prediction or an offline prediction is selected based on a network condition.

In addition, the prediction mode option may include a first option corresponding to the offline prediction mode, a second option corresponding to the online prediction mode, and a third option corresponding to the hybrid mode. The executor may determine the current prediction mode by detecting which option is currently selected. It should be pointed out that the customization of the prediction service may be realized by providing the user with a prediction mode option for the user's selection.

Step 402, recognizing the to-be-recognized information using the deep learning prediction model, in response to determining that the offline prediction mode is currently in use.

In some embodiments, the executor may recognize the to-be-recognized information using the deep learning prediction model, in response to determining that the offline prediction mode is currently in use. For example, the to-be-recognized information is directly input to the deep learning prediction model, and a reorganization result is obtained.

Alternatively, the executor may directly present the reorganization result to the user, and may also output the reorganization result to a specified storage location.

In some alternative implementations of some embodiments, in response to determining that the hybrid prediction mode is currently in use, the executor may first inspect whether the target device is in communication connection with the cloud server. If it is determined that the target device is not currently in communication connection with the cloud server, the executor may recognize the to-be-recognized information using the deep learning prediction model.

It should be understood that the executor may use various methods to inspect whether the target device is in communication connection with the cloud server. For example, the executor may test the network connectivity of the cloud server by using a Ping command. As another example, the executor may locally store a file for recording of a communication connection status (e.g., a communication connection, a non-communication connection) between the target device and the cloud server in real-time. The executor may determine whether the target device is in communication connection with the cloud server by inspecting the connection status.

In some alternative implementations of some embodiments, in response to determining that the hybrid mode is currently in use and the target device is in communication connection with the cloud server, or determining that the online prediction mode is currently in use, the executor may transmit the to-be-recognized information to the cloud server, thereby making the cloud server recognize the to-be-recognized information, and receive the reorganization result.

In some alternative implementations of some embodiments, before recognizing the to-be-recognized information using the deep learning prediction model, the executor may detect a computing acceleration command. The computing acceleration command is generated in response to a preset computing acceleration option (the computing acceleration option described in the embodiment of FIG. 2) being selected. Then, in response to detecting the computing acceleration command, the executor may determine, based on preset device information of the target device (such as the device information described in the embodiment shown in FIG. 2), whether the target device includes a heterogeneous computing chip associated with the computing acceleration command. Finally, in response to determining that the target device includes the heterogeneous computing chip, the executor may schedule an operation of a layer associated with the heterogeneous computing chip in the deep learning prediction model onto the heterogeneous computing chip for executing. In this way, in the prediction process, the heterogeneous computing chip may be called to perform calculations, thereby improving the prediction speed.

It should be noted that the executor may extract the topology description from the deep learning prediction model. For each of the layers in the deep learning prediction model, the executor may inspect whether the description information related to the layer in the topology description includes information associated with the heterogeneous computing chip, for example, the category name of the heterogeneous computing chip. If information associated with the heterogeneous computing chip is included, the executor may determine the layer as a layer associated with the heterogeneous computing chip. In addition, the executor may schedule the operation of the layer associated with the heterogeneous computing chip onto the heterogeneous computing chip for executing, using hardware commands associated with the heterogeneous computing chip.

The method for recognizing information provided by the above embodiments of the present disclosure determines a current prediction mode, in response to receiving to-be-recognized information associated with a deep learning prediction model (model generated using the method described in the embodiment shown in FIG. 2), and may recognize the to-be-recognized information using the deep learning prediction model, in response to determining that the offline prediction mode is currently in use. Therefore, the setting of the prediction mode is effectively utilized, and the user may pre-select a desired prediction mode, thereby realizing the customization of the prediction service. For example, when it is detected that the user has pre-selected the offline prediction mode, the to-be-recognized information is locally recognized using the deep learning prediction model.

Figure 5:
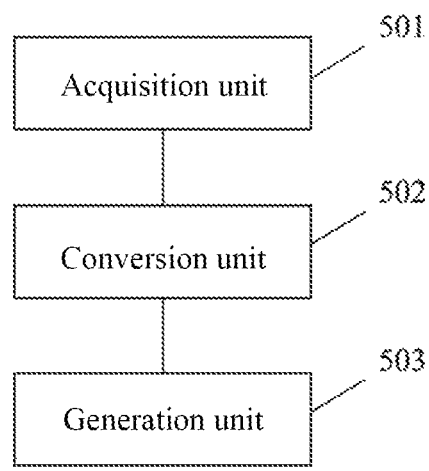
FIG. 5 is a schematic structural diagram of an embodiment of an apparatus for generating a model according to the present disclosure.

With further reference to FIG. 5, as an implementation of the method shown in the above figures, the present disclosure provides an embodiment of an apparatus for generating a model. The apparatus embodiment corresponds to the method embodiment shown in FIG. 2, and the apparatus may specifically be applied to various electronic devices.

As shown in FIG. 5, the apparatus 500 for generating a model of some embodiments may include: an acquisition unit 501, configured to acquire a to-be-converted model, a topology description of the to-be-converted model, and device information of a target device; a conversion unit 502, configured to convert, based on the topology description and the device information, parameters and operators of the to-be-converted model to obtain a converted model applicable to the target device; and a generation unit 503, configured to generate a deep learning prediction model based on the converted model.

In some embodiments, in the apparatus 500 for generating a model, the specific processing and the technical effects of the acquisition unit 501, the conversion unit 502, and the generation unit 503 may be respectively referred to the related descriptions of step 201, step 202, and step 203 in the corresponding embodiment of FIG. 2, and detailed description thereof will be omitted.

In some alternative implementations of some embodiments, the device information may include a heterogeneous computing chip type identifier and an command set version; and the conversion unit 502 may be further configured to: acquire a preset parameter conversion template and a preset operator conversion template associated with the heterogeneous computing chip type identifier and the command set version; for a layer included in the to-be-converted model, analyze parameters and operators in the layer based on the topology description, convert the parameters in the layer based on the parameter conversion template, and convert the operators in the layer based on the operator conversion template.

In some alternative implementations of some embodiments, the generation unit 503 may be further configured to: perform, in response to detecting a model compression command, a compression indicated by the model compression command on the converted model to obtain a compressed model, and use the compressed model as the deep learning prediction model; where the model compression command may be generated in response to a preset model compression option being selected, and the model compression option may include at least one of: a first model compression option for reducing precision of the parameters, a second model compression option for merging or pruning layers in the model, or a third model compression option for pruning the parameters of the model.

In some alternative implementations of some embodiments, the apparatus 500 may further include: a software development kit providing unit (not shown in the figure), configured to provide a software development kit corresponding to the target device to a user, where the software development kit may be used for providing a model prediction interface associated with the deep learning prediction model.

In some alternative implementations of some embodiments, the apparatus 500 may further include: a first generation unit (not shown in the figure), configured to generate an application corresponding to the target device, the application being integrated with the deep learning prediction model.

The apparatus provided by the some embodiments of the present disclosure acquires a to-be-converted model, a topology description of the to-be-converted model, and device information of a target device, so as to converts, based on the topology description and the device information, parameters and operators of the to-be-converted model to obtain a converted model applicable to the target device, and generates a deep learning prediction model applicable to the target device based on the converted model, thereby enabling the conversion of an existing model to a deep learning prediction model that can be applied to a target device.

Figure 6:
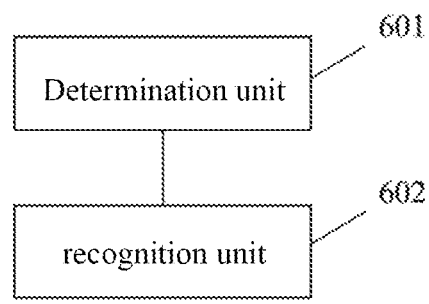
FIG. 6 is a schematic structural diagram of an embodiment of an apparatus for recognizing information according to the present disclosure.

With further reference to FIG. 6, as an implementation of the method shown in the above figures, the present disclosure provides an embodiment of an apparatus for recognizing information. The apparatus embodiment corresponds to the method embodiment shown in FIG. 4, and the apparatus may specifically be applied to various electronic devices.

As shown in FIG. 6, the apparatus 600 for recognizing information of some embodiments may include: a determination unit 601, configured to determine a current prediction mode, in response to receiving to-be-recognized information associated with a deep learning prediction model (a model generated using the method described in the embodiment shown in FIG. 2), where the prediction mode may include an offline prediction mode for performing predictions locally on the target device, and the target device may be a device containing the deep learning prediction model; and a reorganization unit 602, configured to recognize the to-be-recognized information using the deep learning prediction model, in response to determining that the offline prediction mode is currently in use.

In some embodiments, in the apparatus 600 for recognizing information, the specific processing and the technical effects of the determination unit 601 and the reorganization unit 602 may be respectively referred to the related descriptions of step 401 and step 402 in the corresponding embodiment of FIG. 4, and detailed description thereof will be omitted.

In some alternative implementations of some embodiments, the predication mode may further include a hybrid mode for selecting an online prediction or an offline prediction based on a network condition; and the apparatus 600 may further include: a first determination unit (not shown in the figure), configured to determine whether the target device is currently in communication connection with a cloud server, in response to determining that the hybrid mode is currently in use; and a first reorganization unit (not shown in the figure), configured to recognize the to-be-recognized information using the deep learning prediction model, in response to determining that the target device is not currently in communication connection with the cloud server.

In some alternative implementations of some embodiments, the apparatus 600 may further include: a second determination unit (not shown in the figure), configured to determine, based on preset device information of the target device, whether the target device includes a heterogeneous computing chip associated with a computing acceleration command, in response to detecting the computing acceleration command, where the computing acceleration command may be generated in response to a preset computing acceleration option being selected, and the computing acceleration option may include at least one of: a first computing acceleration option for accelerating computing using a network processor, a second computing acceleration option for accelerating computing using a graphics processor, or a third computing acceleration option for accelerating computing using a field programmable gate array; and a scheduling unit (not shown in the figure), configured to schedule an operation of a layer associated with the heterogeneous computing chip in the deep learning prediction model onto the heterogeneous computing chip for executing, in response to determining that the target device includes the heterogeneous computing chip.

Figure 7:
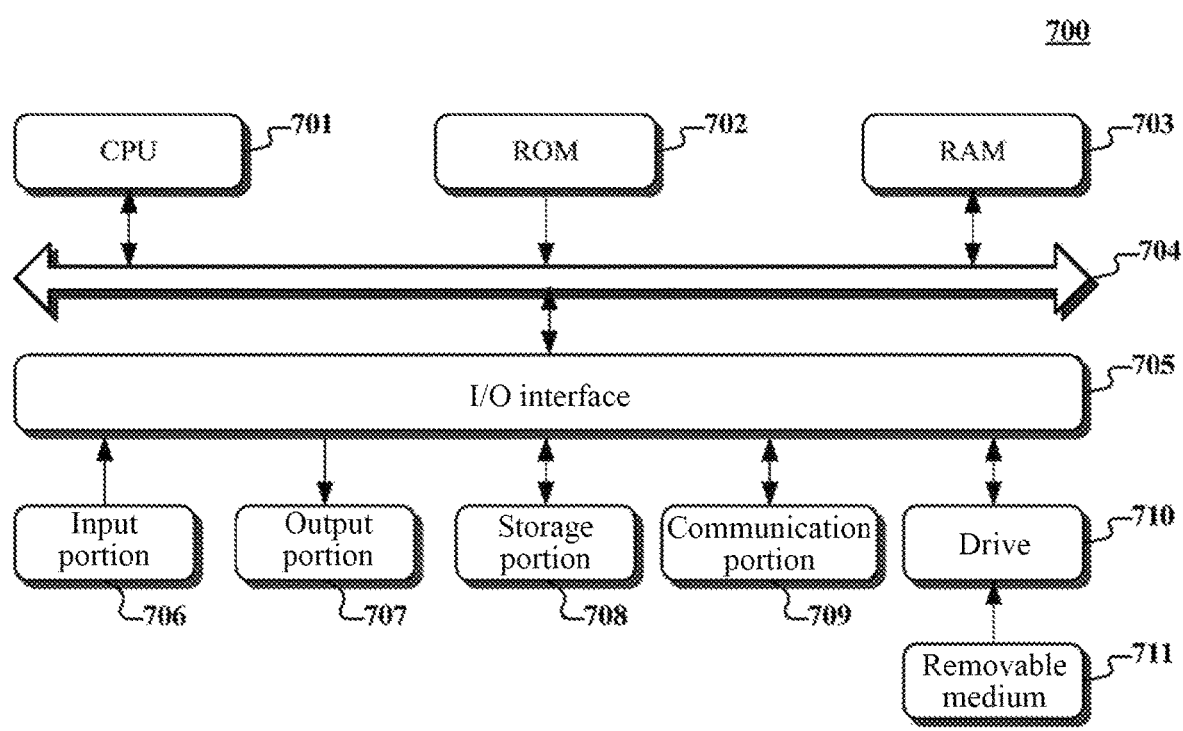
FIG. 7 is a schematic structural diagram of a computer system adapted to implement an electronic device of the embodiments of the present disclosure.

With further reference to FIG. 7, a schematic structural diagram of a computer system 700 adapted to implement an electronic device (for example, the terminal device 101 as shown in FIG. 1) of the embodiments of the present disclosure is shown. The electronic device shown in FIG. 7 is merely an example, and should not limit the function and scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse, etc.; an output portion 707 including such as a cathode ray tube (CRT), a liquid crystal display device (LCD), a speaker, etc.; a storage portion 708 including a hard disk and the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 709, and/or may be installed from the removable medium 711. The computer program, when executed by the central processing unit (CPU) 701, implements the above mentioned functionalities as defined by the system of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an acquisition unit, a conversion unit, and a generation unit. Here, the names of these units do not in some cases constitute a limitation to such units themselves. For example, the acquisition unit may also be described as "a unit for acquiring a to-be-converted model, a topology description of the to-be-converted model, and device information of a target device."

In another aspect, the present disclosure further provides a non-transitory computer readable medium. The computer readable medium may be included in the electronic device in the above described embodiments, or a stand-alone computer readable medium not assembled into the electronic device. The computer readable medium carries one or more programs. The one or more programs, when executed by the electronic device, cause the electronic device to: acquire a to-be-converted model, a topology description of the to-be-converted model, and device information of a target device; convert, based on the topology description and the device information, parameters and operators of the to-be-converted model to obtain a converted model applicable to the target device; and generate a deep learning prediction model based on the converted model. It may also cause the electronic device to: determine a current prediction mode, in response to receiving to-be-recognized information associated with a deep learning prediction model, the prediction mode including an offline prediction mode for performing predictions locally on the target device, and the target device being a device containing the deep learning prediction model; and recognize the to-be-recognized information using the deep learning prediction model, in response to determining that the offline prediction mode is currently in use.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for generating a model, the method comprising:
    acquiring a to-be-converted model, a topology description of the to-be-converted model, and device information of a target device;
    converting parameters and operators of the to-be-converted model to obtain a converted model applicable to the target device based on the topology description and the device information; and
    generating a model for deep learning prediction based on the converted model, wherein the generating comprises: in response to detecting a model compression command, performing a compression operation indicated by the model compression command on the converted model to obtain a compressed model, and using the compressed model as the deep learning prediction model, wherein the model compression command is generated in response to a preset model compression option being selected, and the model compression option comprises at least one of: a first model compression option for reducing precision of the parameters, a second model compression option for merging or pruning layers in the converted model, or a third model compression option for pruning the parameters of the converted model; and
    providing a software development kit corresponding to the target device to a user, wherein the software development kit is used for providing a model prediction interface associated with the deep learning prediction model.

2. The method according to claim 1, wherein the method further comprises:
    generating an application corresponding to the target device, the application being integrated with the model for deep learning prediction.

3. The method according to claim 1, further comprising:
    determining a current prediction mode, in response to receiving to-be-recognized information associated with the model for deep learning prediction, wherein the prediction mode comprises an offline prediction mode for indicating to perform predictions locally on the target device, and the target device is a device containing the model for deep learning prediction; and
    recognizing the to-be-recognized information by using the model for deep learning prediction, in response to determining that the offline prediction mode is currently in use.

4. The method according to claim 3, wherein the prediction mode further comprises a hybrid mode for indicating to select an online prediction or an offline prediction based on a network condition; and
    the method further comprises:

determining whether the target device is currently in communication connection with a cloud server, in response to determining that the hybrid mode is currently in use; and recognizing the to-be-recognized information by using the model for deep learning prediction, in response to determining that the target device is not currently in communication connection with the cloud server.

5. The method according to claim 3, wherein before recognizing the to-be-recognized information by using the model for deep learning prediction, the method further comprises:

determining, based on preset device information of the target device, whether the target device comprises a heterogeneous computing chip associated with a computing acceleration command, in response to detecting the computing acceleration command, wherein the computing acceleration command is generated in response to that a preset computing acceleration option is selected, and the computing acceleration option comprises at least one of: a first computing acceleration option for indicating to invoke a network processor for accelerating computing, a second computing acceleration option for indicating to invoke a graphics processor for accelerating computing, or a third computing acceleration option for indicating to invoke a field programmable gate array for accelerating computing; and scheduling an operation of a layer associated with the heterogeneous computing chip in the model for deep learning prediction onto the heterogeneous computing chip for executing, in response to determining that the target device comprises the heterogeneous computing chip.

6. An apparatus for generating a model, the apparatus comprising:

at least one processor; and a memory storing instructions, the instructions when executed by the at least one processor, cause the at least one processor to perform operations, the operations comprising:

acquiring a to-be-converted model, a topology description of the to-be-converted model, and device information of a target device;

converting parameters and operators of the to-be-converted model to obtain a converted model applicable to the target device, based on the topology description and the device information; and generating a model for deep learning prediction based on the converted model, wherein the generating comprises: in response to detecting a model compression command, performing a compression operation indicated by the model compression command on the converted model to obtain a compressed model, and using the compressed model as the deep learning prediction model, wherein the model compression command is generated in response to a preset model compression option being selected, and the model compression option comprises at least one of: a first model compression option for reducing precision of the parameters, a second model compression option for merging or pruning layers in the converted model, or a third model compression option for pruning the parameters of the converted model; and providing a software development kit corresponding to the target device to a user, wherein the software development kit is used for providing a model prediction interface associated with the deep learning prediction model.

7. The apparatus according to claim 6, wherein the operations further comprise:

generating an application corresponding to the target device, the application being integrated with the model for deep learning prediction.

8. The apparatus according to claim 6, wherein the operations further comprise:

determining a current prediction mode, in response to receiving to-be-recognized information associated with the model for deep learning prediction, the prediction mode comprises an offline prediction mode for indicating to perform predictions locally on the target device, and the target device being a device containing the model for deep learning prediction; and recognizing the to-be-recognized information using the model for deep learning prediction, in response to determining that the offline prediction mode is currently in use.

9. The apparatus according to claim 8, wherein the prediction mode further comprises a hybrid mode for selecting an online prediction or an offline prediction based on a network condition; and the operations further comprise:

determining whether the target device is currently in communication connection with a cloud server, in response to determining that the hybrid mode is currently in use; and recognizing the to-be-recognized information by using the model for deep learning prediction, in response to determining that the target device is not currently in communication connection with the cloud server.

10. The apparatus according to claim 8, wherein the operations further comprise:

determining, based on preset device information of the target device, whether the target device comprises a heterogeneous computing chip associated with a computing acceleration command, in response to detecting the computing acceleration command, wherein the computing acceleration command is generated in response to a preset computing acceleration option being selected, and the computing acceleration option comprises at least one of: a first computing acceleration option for indicating to invoke a network processor for accelerating computing, a second computing acceleration option for indicating to invoke a graphics processor for accelerating computing, or a third computing acceleration option for indicating to invoke a field programmable gate array for accelerating computing; and scheduling an operation of a layer associated with the heterogeneous computing chip in the model for deep learning prediction onto the heterogeneous computing chip for executing, in response to determining that the target device comprises the heterogeneous computing chip.

11. A non-transitory computer-readable storage medium storing a computer program, the computer program when executed by one or more processors, causes the one or more processors to perform operations, the operations comprising:

acquiring a to-be-converted model, a topology description of the to-be-converted model, and device information of a target device;

converting parameters and operators of the to-be-converted model to obtain a converted model applicable to the target device, based on the topology description and the device information;

generating a model for deep learning prediction based on the converted model wherein the generating comprises: in response to detecting a model compression command, performing a compression operation indicated by the model compression command on the converted model to obtain a compressed model, and using the compressed model as the deep learning prediction model, wherein the model compression command is generated in response to a preset model compression option being selected, and the model compression option comprises at least one of: a first model compression option for reducing precision of the parameters, a second model compression option for merging or pruning layers in the model, or a third model compression option for pruning the parameters of the model; and providing a software development kit corresponding to the target device to a user, wherein the software development kit is used for providing a model prediction interface associated with the deep learning prediction model.

12. The non-transitory computer-readable storage medium according to claim 11, wherein the operations comprise:

determining a current prediction mode, in response to receiving to-be-recognized information associated with the model for deep learning prediction, the prediction mode comprises an offline prediction mode for performing predictions locally on the target device, and the target device is a device containing the model for deep learning prediction; and recognizing the to-be-recognized information by using the model for deep learning prediction, in response to determining that the offline prediction mode is currently in use.

* * * * *